No. 690,567. Patented Jan. 7, 1902.
T. DRYNAN.
FRUIT OR FLOWER PICKER.
(Application filed Nov. 8, 1901.)
(No Model.)
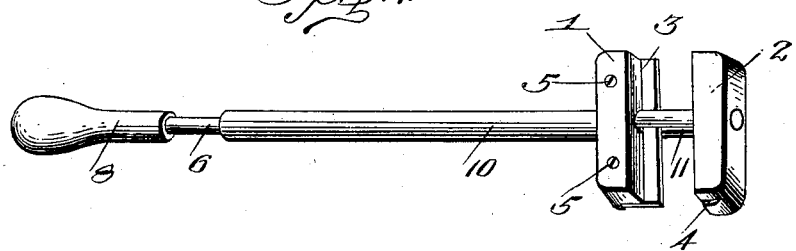
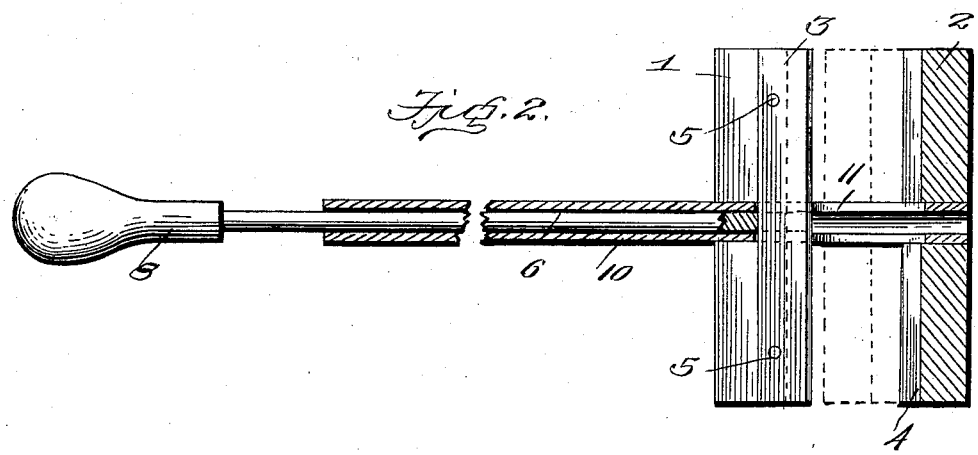
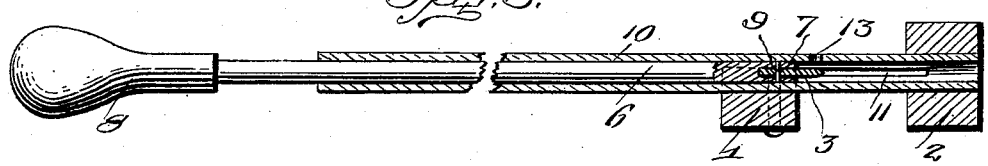
Inventor
Thomas Drynan
Witnesses
By H. B. Willson & Co.
Attorneys

UNITED STATES PATENT OFFICE.

THOMAS DRYNAN, OF SEWICKLEY, PENNSYLVANIA.

FRUIT OR FLOWER PICKER.

SPECIFICATION forming part of Letters Patent No. 690,567, dated January 7, 1902.

Application filed November 8, 1901. Serial No. 81,616. (No model.)

*To all whom it may concern:*

Be it known that I, THOMAS DRYNAN, a citizen of the United States, residing at Sewickley, in the county of Allegheny and State of Pennsylvania, have invented certain new and useful Improvements in Fruit or Flower Pickers; and I do declare the following to be a full, clear, and exact description of the invention, such as will enable others skilled in the art to which it appertains to make and use the same.

The invention relates to fruit or flower pickers of that type in which the stem of the fruit or flower after having been severed will be securely grasped and be prevented from falling to the ground.

The object of the invention is to provide an implement of this character which shall be simple of construction, durable in use, comparatively inexpensive of production, efficient in action, and by means of which flowers and fruit out of reach of the hands may be easily and expeditiously gathered.

With these and other objects in view the invention consists of certain novel features of construction, combination, and arrangement of parts, which will be hereinafter more fully described, and particularly pointed out in the appended claims.

In the accompanying drawings, Figure 1 is a perspective view of my improved implement. Fig. 2 is a longitudinal transverse sectional view, and Fig. 3 is a longitudinal vertical sectional view taken at right angles to Fig. 2.

Referring to the drawings, 1 and 2 denote the jaws or heads of the implement, one being provided with a knife 3 and the other with a knife-receiving groove or slit 4. In the present instance I have shown the jaw or head 1 as being provided with the knife and the jaw or head 2 as being formed with the slit or groove. The knife is seated upon the jaw 1, which is of less thickness than the jaw 2 and is held thereto by screws or other fastening means 5.

6 denotes a rod which extends through the jaw or head 1 and is provided at one end with a slot 7 and at the other end with a handle 8. The knife is seated in the slot 7 and is held therein by a vertically-disposed screw or pin 9.

10 denotes a tube surrounding the rod 6 and extending through the jaw or head 1 and into and connected to the jaw or head 2. This tube is provided with transverse slots 11 to permit of the free sliding movement of the knife, which extends through the slots and prevents rotary movement of one jaw with respect to the other, thereby retaining them in true operative parallelism. The tube is also provided with small holes 13 to permit the pin or screw 9 to be inserted through the tube for connecting the knife to the rod.

In assembling the parts the tube is connected to the jaw 2 in any suitable manner, the jaw 1 slipped upon the tube, and the rod 6 inserted through the rear end of the tube. The knife is now inserted through the longitudinal slots of the tube and engaged in the slot of the rod. The rod and knife are now moved to cause the pin or screw holes to register with the holes 13, in which position the screw or pin may be inserted through the apertures 13 into the apertures of the knife and end of the rod, thus securely connecting the rod to the knife. The rod is now drawn inwardly to cause the inner edge of the knife to engage the groove of the jaw 1, and in this position the screws or other fastenings 5 are inserted through the jaw 1 to lock the knife in the groove of said jaw and lock said jaw to the rod.

In operation the implement is moved to bring the stem of the fruit or shrubbery between the jaws, the operator grasping with one hand the tube and with the other the rod. Now by forcing the rod forwardly or drawing the tube rearwardly the jaws will be moved toward each other, thus severing the stem of the fruit or flower and securely holding the severed stem between the jaws.

This device is particularly useful in gathering fruit and flowers growing a considerable distance above the ground and out of reach of the hands of a person, and as the device holds the severed fruit or flower the same is not damaged by falling upon the ground.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with two jaws, of a rod attached to one jaw, and a tube embracing said rod and extending through the jaw to which the rod is attached and attached to the second jaw and one of said jaws being provided with a knife which coacts with the opposite jaw, substantially as set forth.

2. The combination with two jaws, of a rod attached to one jaw, and a tube embracing said rod and extending through the jaw to which the rod is attached and attached to the second jaw, and one of said jaws being provided with a knife which coacts with the opposite jaw, one of said jaws being of less thickness than the other jaw whereby the stem when severed will be grasped by said jaws, substantially as set forth.

3. The combination with coacting jaws, one of which is provided with a knife and the other with a slit or groove to receive the knife, of a rod extending through the jaw and secured to the knife, a tube secured to the other jaw and extending through the jaw carrying the knife and embracing said rod and provided with longitudinal slots in which the knife works and by which the limit of movement of said jaws is effected and their true parallelism maintained, substantially as set forth.

In testimony whereof I have hereunto set my hand in presence of two subscribing witnesses.

THOMAS DRYNAN.

Witnesses:
   JNO. P. WALKER,
   D. R. SCOTT.